ALTERNATE ROUTING IN TELEPHONE SYSTEMS

Filed Dec. 21, 1961

INVENTOR
J. MATTHIEU
V. SCHMIDT
H. WOLLER
BY Paul W Hemminger
ATTORNEY 3,202,766
Patented Aug. 24, 1965

3,202,766

ALTERNATE ROUTING IN TELEPHONE SYSTEMS

Johannes Matthieu, Stuttgart-Stammheim, Volker Schmidt, Stuttgart-Weilimdorf, and Horst Woller, Korntal, Germany, assignors to International Standard Electric Corporation, New York, N.Y., a corporation of Delaware Filed Dec. 21, 1961, Ser. No. 161,194
Claims priority, application Germany, Dec. 23, 1960, St 17,270
5 Claims. (Cl. 179—18)

This invention relates in general to automatic telephone systems and in particular to the alternate routing of calls between two or more telephone exchanges when all of the available trunk lines between calling and called exchanges are busy. Its principal object is to provide a new and improved alternate routing telephone system which is economical and reliable in operation.

In a multi-exchange telephone network, each of the exchanges is connected to every other exchange either by direct trunk lines extending therebetween or by tandem trunk lines passing through one or more exchanges. The number of trunk lines between two direct-connected exchanges are often insufficient to handle all traffic thereover during the peak traffic hours. Additional lines are seldom added since the cost of providing additional lines is often not justified. To provide the required service under such conditions, it is common practice to set up alternate paths between two exchanges other than over the direct trunk lines. These alternate paths include additional exchanges which are tandem connected between the calling and called exchanges.

When alternate paths are established, additional trunk line directing digits must be generated so that the switching equipment of the calling exchange selects a trunk line to the additional tandem exchange which must be included in the alternate path. Also, in cases wherein access to a called exchange includes a tandem exchange, similar additional digits are required. In many systems capable of handling both of the cases, a storage device is required for receiving the digits concerning the called exchange and the line served thereby and for causing the transmission of special routing codes concerning the exchanges to be included in the desired connection.

Known arrangements in step-by-step and motor driven selectors cause the automatic transmission of the special routing codes by arranging the direct route trunk lines on the first group of bank terminals of each level by arranging the alternate route trunk lines on the last group of terminals on each level. The sleeve wire of each alternate route trunk line is led to an associated outgoing repeater through appropriate switching apparatus. The outgoing repeater thereafter transmits the necessary special routing code. These arrangements require a number of bank terminals equal to the sum of the direct trunk lines and the alternate trunk lines.

Other known arrangements utilize a hunting selector stage on the outputs of a final selector switch with the direct trunk lines having preference over the alternate route trunk lines. These systems effect the transmission of the special routing code in the manner above described.

It is an object of the present invention to reduce the number of outputs on the selector stages for handling alternate routing by utilizing the marker control wires to control the switching stages to select an outgoing repeater arranged to generate a predetermined code. In this way, the outputs on the selectors correspond to the number of direct trunk lines only and the transmission of special routing digits is controlled by the outgoing repeaters and markers.

Other objects and features of the invention will become apparent and the invention will be best understood when the specification is read in conjunction with the drawings comprising FIGS. 1 to 3 wherein:

FIG. 2 shows a simplified circuit diagram of the common control equipment of a typical exchange modified in accordance with the invention; and FIG. 3 shows a simplified circuit diagram of a repeater used in transmitting special routing digits.

Figure 1:
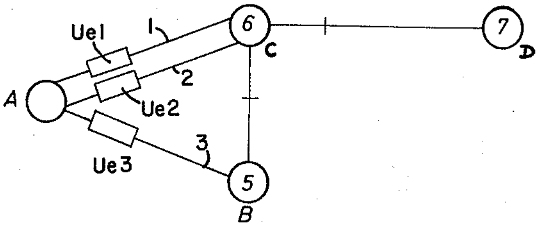
FIG. 1 shows a single-line trunking diagram of a multi-exchange network in which the invention is applicable.
Figure 1:
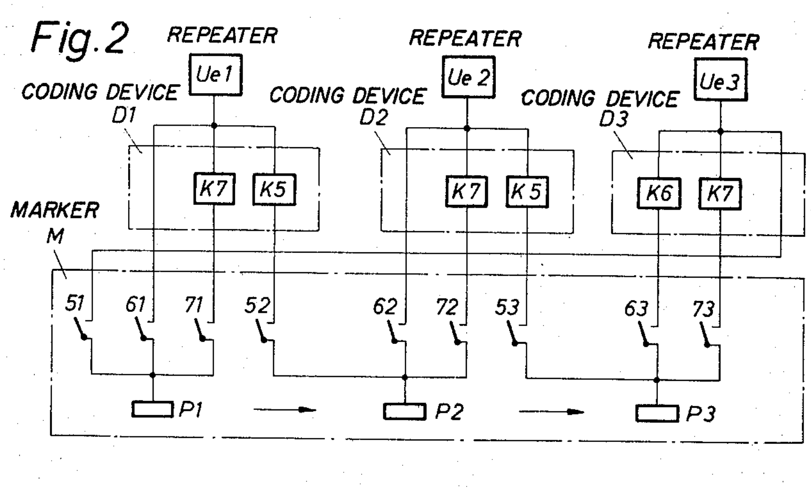
Figure 1:
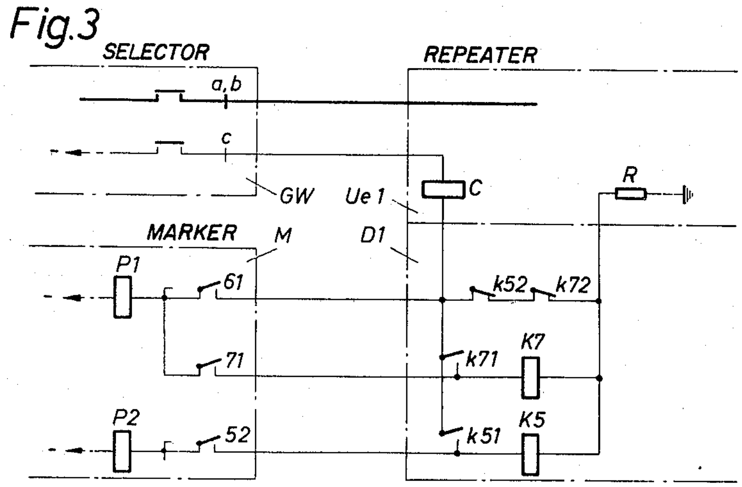

Referring now to FIG. 1 of the drawings, a description of the invention will be given.

In FIG. 1, four exchanges A, B, C and D are shown with exchange A being directly interconnected with exchange B over repeater Ue3 and its associated trunk line 3, and with exchange A being directly interconnected with exchange C over either repeater Ue1 and associated trunk line 1 or repeater Ue2 and its associated trunk line 2. The code digits 5, 6 and 7 are assigned as telephone number prefixes to subscribers in exchanges B, C and D respectively. Calls from exchange A to exchange B are established by dialing the code digit 5, calls from exchange A to exchange C are established by dialing the code digit 6, and calls from exchange A to exchange C are established by dialing the code digit 7.

When the code digit 5, indicative of exchange B, is dialed by a subscriber in exchange A, the path to exchange B may be selected directly through repeater Ue3, or may be selected indirectly to exchange B through exchange C by using either repeater Ue1 or Ue2. If the direct path including repeater Ue3 is busy, and the noted indirect path is selected through an idle one of the repeaters Ue1 or Ue2, the selected one of these repeaters must repeat the code digit 5 to cause exchange C to further extend the connection to the desired exchange B.

When the code digit 6, indicative of exchange C, is dialed by a subscriber in exchange A, the path to exchange C may be selected directly through an idle one of the repeaters Ue1 or Ue2, or may be selected indirectly to exchange C through exchange B by using repeater Ue3. In the latter case, exchange B must repeat the code digit 6 to cause exchange B to further extend the connection to the desired exchange C.

Similarly, connections to exchange D can be extended through either exchange B or C as a tandem exchange with the code digit 7 assigned exchange D being repeated to further extend the connection.

The repeaters Ue1 to Ue3 may be similar to those shown, for example, in pages 266 and 267 of the book "Telephony," vol. II, 1950, by J. Atkinson and published by The Pitman Publishing Co., New York, New York.

Referring now to FIG. 2, the manner in which the code digits are repeated will be described. Each of these repeaters Ue1, Ue2 and Ue3 has a coding device, such as D1, D2 and D3 respectively assigned thereto which perform a code prefixing function. These devices or impulse repeaters may be similar to those shown and described, for example, in pages 200 to 217 of the noted "Telephony" publication. The particular code prefix which is to precede the normal trains of pulses is controlled by the code-prefixing relays K7 and K5 located in the coding device D1, by code-prefixing relays K7 and K5 located in coding device D2; and by code-prefixing relays K6 and K7 located in coding device D3. The code-prefixing relays are energized over the marking test wires through contacts controlled by test relays P1, P2 and P3 located within marker M. A full disclosure of the marker M is set forth in German Patent No. 973,318, issued in 1959 to K. Klinkhammer and entitled "Circuit Arrangement for PABX." The contacts are indicated by the two-digit numbers and those contacts which have the same digit in the first position are operated simultaneously when the number dialed by the subscriber corresponds thereto.

For example, if a subscriber wants to reach the exchange B identified by the code 5, the dialing of the number 5 causes the contacts 51, 52, 53 to be closed by marker M operation as described for equivalent test relays shown in the noted German patent. Thereupon, a potential (not shown) is applied to the chain-connected test relays P1, P2, P3.

If the repeater Ue3 is free, it being assigned to digit 5 trunk lines, only the test relay P1 can remain energized since it is first in preference in the noted preference lockout chain described in the noted German patent. In this case no code prefixing is necessary since the trunk line 3 which is connected to the repeater Ue3 leads directly to exchange B.

In the busy-condition of the repeater Ue3, the next relay in the order of preference, remains energized. In this case test relay P2 remains energized. The contacts 52 and the code-prefixing relay K5 in the coding device D1 determine the idle or busy condition of repeater Ue1, as will be described in detail in connection with FIG. 3. If repeater Ue1 is idle, the selector is set to the line 1. In the conventional manner similar to that described in the noted "Telephony" publication, the code-prefixing relay K5 causes the transmission of a train of pulses corresponding to the code number 5. These pulses may originate from the digit store in the final selector as will be described later. These pulses control exchange C to select exchange B.

If both the repeaters Ue1 and Ue3 are busy, then the test relay P3 remains energized and the repeater Ue2 is seized. Thereafter, code-prefixing relay K5 in the coding device D2 causes the prefixing of a train of pulses corresponding to the code number 5.

If the exchange D identified by the code number 7 is called, it is reached in a similar way over lines 1, 2 or 3 with the aid of a code prefixing. If line 3 is selected, the code number 7 would have to be repeated by exchanges B and C.

FIG. 3 is a more detailed representation of the test circuits used with a group selector GW as regards the repeater Ue1. The repeater Ue1 can be used for establishing a connection to the exchange C, and can be used for establishing a connection to exchanges D and B. Accordingly, the marking test wires are associated with contacts 61, 71, 52 as well as with the code-prefixing relays K7 and K5. These contacts are closed by the marker M as before described when the digits 6, 7 or 7 respectively, are dialed. The marking test wire which is led through contact 61 is connected to one terminal of a seizing relay C in repeater Ue1. The other terminal of relay C is connected to the *c*-wire or sleeve wire of the group selector and through a test relay (not shown) in the group selector to a negative potential. This group selector test relay, as well as the test relays P1 and P2 of marker M are provided in the conventional manner with a regular winding and with a high-resistant winding which is capable of being shorted by its own relay contacts, A contact K71 or K51 of relays K7 and K5 are connected between the connecting terminal of the seizing relay C associated with contact 61, and the code-prefixing relays K7 and K5. The other terminals of relays K7 and K5 are connected to ground through a resistor R. Between this resistor and the aforementioned connecting point of the seizing relay C there is connected a series-connection consisting of the back contacts *k*52, *k*72.

If, as a result of the selection or dialing performed by the subscriber, the contact 61 has been actuated by marker action and, thereupon negative potential has been applied to the test relays P1 and P2 arranged in a chain circuit, the test relay P1 will operate via the contacts *k*52, *k*72 and the resistor R, provided that the repeater Ue1 is free. The repeater Ue1 is free if the seizing relay C and the test relay in the group selector are not operated. The test relay P1 in cooperation with the usual marker control wires not shown then causes the group selector GW to be connected to the repeater Ue1. In this way the wire *c* is connected through, so that now the seizing relay C is energized.

Corresponding processes are performed upon closure of the contacts 71 or 52, with the only difference being that the respective code-prefixing relay K7 or K5 is energized as well, and is permitted to remain energized through contacts *k*71 or *k*51, respectively, following the setting of the group selector. The back contact *k*72 or *k*52 opens, so that the seizing relay C is only energized by the corresponding code-prefixing relay K7 or K5.

In the described embodiment there have only been assumed two traffic directions with three outgoing lines. Each destination can be reached by each of the three lines. The circuit for each test relay is capable of being completed by operation of one contact of the switching means according to the selected destinations. In the case of additional outgoing lines or traffic directions, there is not always required a complete substitute. For example, it could be pre-determined that the exchange B does not necessarily need to be reached over line 1. In this case the marking wire extending through contact 52 could be omitted.

It will be understood that the invention can also be used in cooperation with a final selector switch. In addition to the outputs to which the subscriber's lines are connected, there may be provided individual out-puts of the final selector switch for the connection of trunk lines which might substitute for one another.

If the invention is applied to a final selector, the trains of dial pulses are stored in respective tens and units stores. At the end of the dialing, the marker, the tens and unit stores are operated. The tens and units stores cause the operation of the test relays, similar to those described hereinbefore, for performing the connection to the respective marking test wires. There is then effected the connection of the test relays and an identification of the code-prefixing relays is completed in the manner as described hereinbefore. The switch that corresponds to the line is set through contacts of the test relays. In the final selector switch, the usual relay as well as the connecting-through relay are operated and the repeater is seized. Subsequently thereto, the transmission is effected of the code prefix.

While the principles of the invention have been described above in connection with specific apparatus and applications, it is to be understood that this description is made only by way of example and not as a limitation on the scope of the invention.

We claim:

1. In a telephone exchange network, a local exchange and first and second remote exchanges, a first group of trunk lines each including repeaters for interconnecting the local exchange with the first remote exchange, a second group of trunk lines each including repeaters for interconnecting the local exchange with the second remote exchange and a third group of trunk lines each including repeaters for interconnecting the said first and second remote exchanges, means in the local exchange responsive to the calling of the first remote exchange for selecting an idle one of said associated first trunks and for operating the associated repeater to extend a connection from the local exchange to the called exchange, testing means operable responsive to all of said first trunk lines being busy for selecting an idle one said second trunk lines as an alternate trunk line for operating the associated repeater to extend a connection from the calling exchange to the second remote exchange, and means in the last-said repeater for automatically controlling the second remote exchange to extend the said connection between the calling exchange and said second remote exchange to said called exchange over an idle one of said third trunk lines.

2. In a telephone exchange network as set forth in claim 1, each of said exchanges having a separate office number assigned thereto, means in each of the repeaters associated with the trunk lines interconnecting any two exchanges for generating the office number of the non-connected exchange, and means in the said testing means for operating the said number generating means in any repeater associated with a trunk line being used as an alternate.

3. In a telephone exchange network as set forth in claim 2, means responsive to the selection of an idle one of said first trunks responsive to the calling of the first remote exchange for disabling the number generating means in the said operated repeater.

4. A telephone exchange network as set forth in claim 1 wherein a third remote exchange is interconnected with said first remote exchange by a group of fourth trunk lines, means in the local exchange responsive to the calling of the said tandem exchange for selecting an idle one of said associated first trunks and for operating the associated repeater to control the said first remote exchange to extend a connection from the calling exchange to the tandem exchange over said selected first trunk and an idle one of said fourth trunks, testing means operable responsive to all of said first trunk lines being busy for selecting an idle one of said second trunk lines as an alternate trunk line and for operating the associated repeater to extend a connection from the calling exchange to the second remote exchange, and means in the last said repeater for automatically controlling the second remote exchange to extend the said connection between the calling exchange and said second exchange to said called fourth remote exchange over an idle one of said fourth trunks.

5. A telephone exchange network as set forth in claim 4 wherein each of said exchanges has a separate office number assigned thereto, means in each of the repeaters associated with the trunk lines interconnecting any two exchanges for generating the office number of the other exchanges, and means in the said testing means for operating one of said office number generating means in any repeater associated with a trunk line being used as an alternate, the particular generating means being operated corresponding to the exchange being called.

References Cited by the Examiner

UNITED STATES PATENTS

| | | | |
|---|---|---|---|
| 1,729,855 | 10/29 | Lubberger | 179—18 |
| 1,750,848 | 3/30 | Lubberger et al. | 179—18 |
| 2,227,488 | 1/41 | Collis et al. | 179—18 |

ROBERT H. ROSE, *Primary Examiner.*

WALTER L. LYNDE, *Examiner.*